(12) United States Patent
Elstner

(10) Patent No.: US 6,171,188 B1
(45) Date of Patent: Jan. 9, 2001

(54) GAME DEVICE FOR AN ENTERTAINMENT SHOW

(75) Inventor: Thomas Elstner, Rue Béatrix de Bourbon (LU)

(73) Assignee: Frank Elsner Produktion S.A., Luxembourg (DE)

( * ) Notice: Under 35 U.S.C. 154(b), the term of this patent shall be extended for 0 days.

(21) Appl. No.: 09/341,468

(22) PCT Filed: Nov. 10, 1997

(86) PCT No.: PCT/EP97/06241

§ 371 Date: Sep. 3, 1999

§ 102(e) Date: Sep. 3, 1999

(87) PCT Pub. No.: WO99/25113

PCT Pub. Date: May 20, 1999

(51) Int. Cl.[7] .............................. A63F 13/00; A63F 9/24; G06F 17/00; G06F 19/00

(52) U.S. Cl. ............................... 463/40; 463/42; 463/47; 273/148 B; 273/148 R; 273/431; 434/323; 434/324; 434/350

(58) Field of Search .................................. 463/40, 41, 42, 463/46, 43, 47, 9, 36; 273/430, 431, 448, 148 B, 148 R; 434/323, 324, 350

(56) References Cited

U.S. PATENT DOCUMENTS

| | | | | |
|---|---|---|---|---|
| 5,193,818 | * | 3/1993 | Leeson | 273/403 X |
| 5,498,003 | * | 3/1996 | Gechter | 273/431 X |
| 5,630,754 | * | 5/1997 | Rebane | 463/9 X |
| 5,681,046 | * | 10/1997 | Lawrence | 273/459 X |
| 5,695,400 | * | 12/1997 | Fennell, Jr. et al. | 463/42 |
| 5,772,509 | * | 6/1998 | Weiss | 463/16 |
| 5,899,456 | * | 5/1999 | Weinstock et al. | 273/243 X |
| 5,984,311 | * | 11/1999 | Stefanik et al. | 273/459 |
| 6,019,371 | * | 2/2000 | Mantis | 273/256 X |

* cited by examiner

Primary Examiner—Michael O'Neill
Assistant Examiner—Binh-An Nguyen
(74) Attorney, Agent, or Firm—Venable; George H. Spencer; Robert Kinberg

(57) ABSTRACT

With respect to a play equipment for staging an entertainment show, for example inside a television studio, it is suggested that specific areas of the monitor wall (2) be assigned to the individual players to permit a more dynamic dramatic scene layout of the entertainment show. A control device (10) which is electrically connected to the mechanically operated switches (3) is designed such that upon activation of a mechanically operated switch (3) by the player reacting first, an optical signal (e.g. signaling color) is displayed in an area of the monitor wall (2) that is assigned to the respective player.

13 Claims, 3 Drawing Sheets

GAME DEVICE FOR AN ENTERTAINMENT SHOW

FIELD OF THE INVENTION

The invention relates to a play equipment for staging an entertainment show, in particular inside a television studio.

BACKGROUND OF THE INVENTION

Entertainment shows in the form of guessing games for players (candidates) are generally organized such that the candidates are asked questions and winning points are awarded to the candidate who first comes up with the correct answer. In order to determine which candidate is the first one to react to a question, the candidates must push a mechanically operated switch, a so-called buzzer, if they want to react to a question. These buzzers are connected to an optical signal that lights up when the buzzer is pushed. The winning points, collected by each candidate during the course of the show, are indicated on a display unit as momentary count of a counter.

It is known that in order to subject the sequence of questions to a principle of random occurrence, individual subject areas for questioning, e.g. sports, literature, history, film, theater, etc., are displayed in a horizontal row on a monitor wall, consisting of individual monitors, and graduated winning point numbers (e.g. 100, 80, 60, 40) are provided underneath the individual subject areas. One of the candidates selects a topic with a winning point number (for example, the first candidate to provide a correct answer to the last question asked), whereupon the moderator reads a question pertaining to the indicated topic, with a degree of difficulty that corresponds to the selected number of winning points. The question is superimposed on the television image for the viewers. The winning points number, selected for the indicated topic, disappears from the monitor wall after the question has been posed, so that during the continued course of the game, the candidate will have fewer and fewer options for selection on the monitor wall.

The image design and dramatic outlay of known types of entertainment shows meanwhile suffer in that only an insignificant movement or change in the scene takes place. Furthermore, the monitor wall as a stage element is of little use for the image design since the displays on the monitor wall change only slightly from question to question. In addition, the places for the candidates with the buzzers are arranged separate from the wall of monitors, so that the studio cameras must swivel back and forth between candidates and monitor wall, which breaks up the cohesiveness of the scene for the entertainment show.

SUMMARY OF THE INVENTION

It is the object of the invention to improve a play equipment of the aforementioned type in such a way that it is possible to design the entertainment show more dynamically with respect to the dramatic image layout.

This object is solved according to the invention with a play equipment for staging an entertainment show, in particular inside a television studio, comprising: a monitor wall, composed of several monitors; signal sources for graphics signals and text signals a control device for controlling at least one of the graphics and text reproduction on the monitors of the monitor wall; mechanically operated switches for a plurality of players; and a display for actual account readout of points collected by each player; wherein specified areas of the monitor wall are assigned to each one of the plurality of players; the mechanically operated switches are electrically connected to the control device; and the control device is designed such that when a mechanically operated switch is activated by a player reacting first, an optical signal is displayed on the area of the monitor wall that is associated with that player.

The invention is based on the novel and surprising idea of using the monitor wall as play equipment and to place the candidates and the monitor wall in a clear spatial relationship to the scene. By doing so, the candidates are located, for example behind the monitor wall on a supporting structure, e.g. a platform, so that at least their heads, but preferably also their upper bodies, project over the top edge of the monitor wall. Optically, each candidate can therefore definitely be assigned a specific area of the monitor wall. If a candidate pushes his/her buzzer (which does not need to be visible to the viewers), an optical signal, e.g. the signaling color red, is displayed on a monitor wall area below the respective candidate, preferably as a vertical stripe extending over the complete height of the monitor wall. The image production thus has a plurality of options for reinforcing the pushing of the buzzer with the aid of dramatic images. As a further special feature, the monitor wall is used for displaying still images or moving image sequences, relating to the individual questions. The course of the entertainment show consequently is loosened up with respect to the scenes and becomes more effective dramatically, as well as more dynamic. It is no longer necessary to use almost the complete area of the monitor wall for displaying the winning points, since the candidates in any case no longer look at the monitor wall. Either all winning points are displayed on a relatively small, vertical stripe on the monitor wall for the studio and television public, or only the winning points number for the momentary play is displayed on one field of the monitor wall. It is critical that monitor wall and candidates are optically inseparably connected, so that during the reproduction of images, graphics, text and numbers on the monitor wall, all candidates are simultaneously "in the picture." Thus, the studio cameras no longer have to swivel back and forth between monitor wall and candidates.

BRIEF DESCRIPTION OF THE DRAWINGS

The invention is explained in further detail with the aid of an exemplary embodiment in the drawings, wherein.

DETAILED DESCRIPTION OF THE PREFERRED EMBODIMENTS

Figure 1:
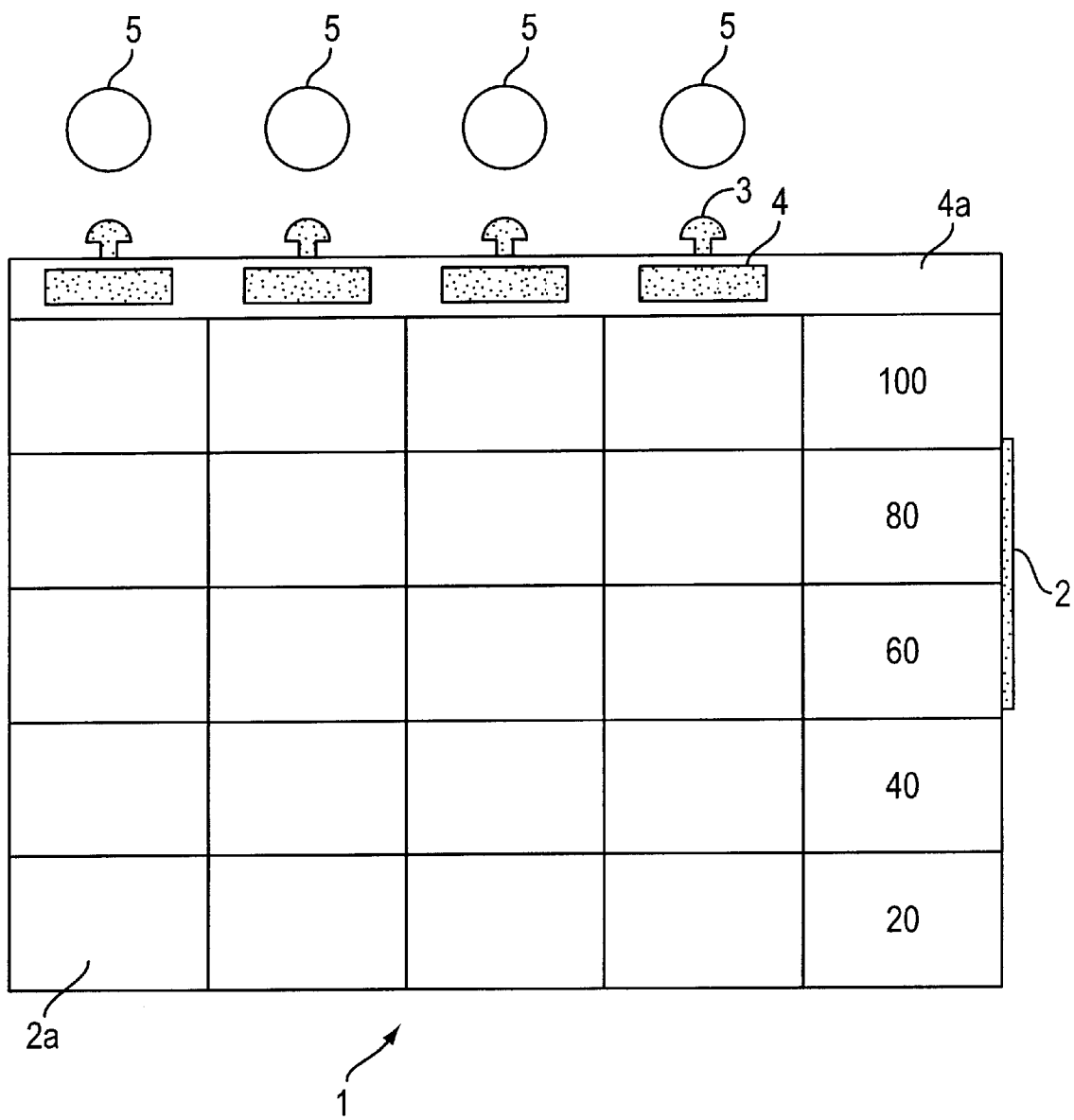
FIG. 1 Shows a view from the front of a monitor wall of an exemplary embodiment of play equipment according to the invention.

The play equipment 1 shown in FIG. 1 is set up, for example, inside a television studio in order to stage an entertainment show, e.g. in the form of a guessing game with several candidates. The entertainment show is recorded with the aid of several video cameras that are not shown here.

The play equipment 1 has a monitor wall 2, composed of several monitors 2a. In the case of FIG. 1, the monitor wall 2 is composed of 5×5 monitors 2a. It is essential that the monitor wall 2 is an integral component of the play equipment 1. This central integration of the monitor wall 2 is explained in the following with the aid of FIG. 2.

Figure 2:
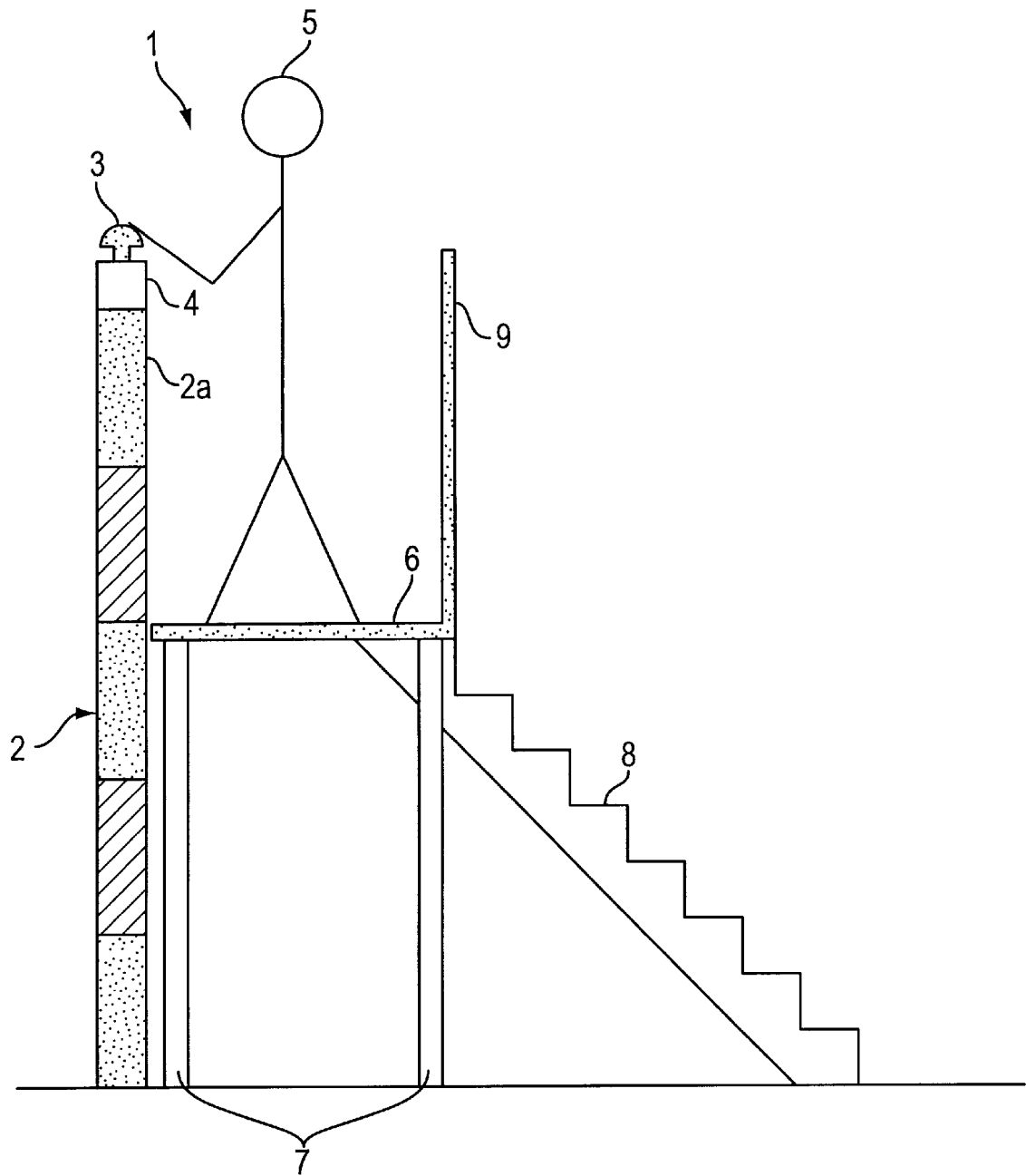
FIG. 2 Shows a vertical section through the monitor wall of another exemplary embodiment, with a platform behind the monitor wall for setting up the candidates.

The schematic illustration in FIG. 2 shows that an accessible platform 6 as supporting structure is located to the rear of monitor wall 2, meaning it is not visible to the public and the video cameras in the studio. The platform is arranged at a height, which allows at least the heads 5 of the candidates in the show, positioned on this platform, to project past the upper edge of monitor wall 2. It is preferable if the studio public in front of the monitor wall 2 not only can see the heads 5 of the candidates, but also the chests and arms. In place of a platform 6, it is also possible to position the candidates behind the monitor wall with the aid of other types of supporting structures, e.g. hanging on a trapeze, in elevators, on raised seats, or the like. It is furthermore conceivable that the monitor wall is installed above seated or standing candidates, thereby allowing for the same fixed spatial coordination between candidates and monitor wall 2 as in the case where the candidates are positioned above the upper edge of the monitor wall 2.

If a platform 6 is used as supporting structure, then the platform 6 is held in the desired height position by a preferably height-adjustable scaffold 7. A staircase 8 leads from the studio floor to the platform 6. In order to avoid accidents, the platform 6 is provided with a railing 9 on the back.

With the embodiment shown in FIGS. 1 and 2, the buzzers 3 for the candidates are installed on the top edge of the monitor wall 2. In the case shown, there are four buzzers 3 for four candidates, positioned side-by-side and at approximately equal distances along the monitor wall 2 (starting with the left side edge of the monitor wall 2). However, it is not absolutely necessary to install the buzzers 4 such that they are visible on the top edge of the monitor wall 2. With the play equipment according to the invention, the pushing of a buzzer 3 by the candidate who first reacts to a question is displayed as an optical signal, e.g. a signaling color, for the studio and television public in an area below the respective candidate.

A shown by example only in FIGS. 1 and 2, a console 4a with number displays 4 for the candidates can also be installed on the top of the monitor wall 2 in addition to the buzzers 3. The momentary counts for the points won by the candidates are displayed on this console for the studio and television public. Alternatively, the console 4a with the number displays 4 can also be installed at the lower edge of the monitor wall 2 or as hanging console, above the heads 5 of the candidates. Furthermore, it is possible to indicate the point counts directly on the monitor wall 2, below or above each individual candidate, by superimposing the digits for the point count onto the video signals for the monitor 2a, below or above the respective candidates.

The staggered winning points (staggered in FIG. 1 as follows: 100, 80, 60, 40, 20) can also be displayed on the monitor wall 2, vertically one above the other. The number of winning points are calculated based on the degree of difficulty of the questions, with 100 winning points, for example, given for the most difficult questions, 80 winning points for difficult questions, 60 winning points for not very easy questions, 40 winning points for easier questions and 20 winning points for very easy questions. It is also possible to show on the monitor wall 2 only the winning point number respectively selected by a candidate.

Displaying the staggered winning points vertically on the monitor wall 2 allows, for example, a continuous display of all winning points while the candidates are asked questions, wherein the momentarily played winning points are emphasized optically during the display so as to differ from the other winning points, e.g. through a change in brightness and/or color.

Thus, the play equipment 1 provides the studio public and if applicable the television public during the complete show with continuous information on the status of the game. In a game with several rounds, where the candidate with the lowest point level, for example, is eliminated after each round, the public can look at the monitor wall 2 and the candidates visible above or below in order to see the momentary status of the game, the degree of difficulty of the momentary question, the point count for the individual candidates and which of the candidates was the first one to push his/her buzzer 3.

Of course, the optical display of candidate-specific data can also include superimposing the first names of candidates via video onto monitor wall 2 areas, which are either below or above the respective candidates.

One very essential step of the present invention consists in displaying not only text, including numbers and graphics on the monitor wall 2, but also still images or moving image sequences by using the complete monitor wall 2 or, if applicable, only several monitors 2a. Dramatic new effects can be achieved for the entertainment show as a result of this image reproduction, wherein the candidates always remain "in the picture," even during the image reproduction. The images and the text are displayed on the monitor wall 2 with the aid of an electronic circuit, an example of which is shown in FIG. 3 as a block diagram.

Figure 3:
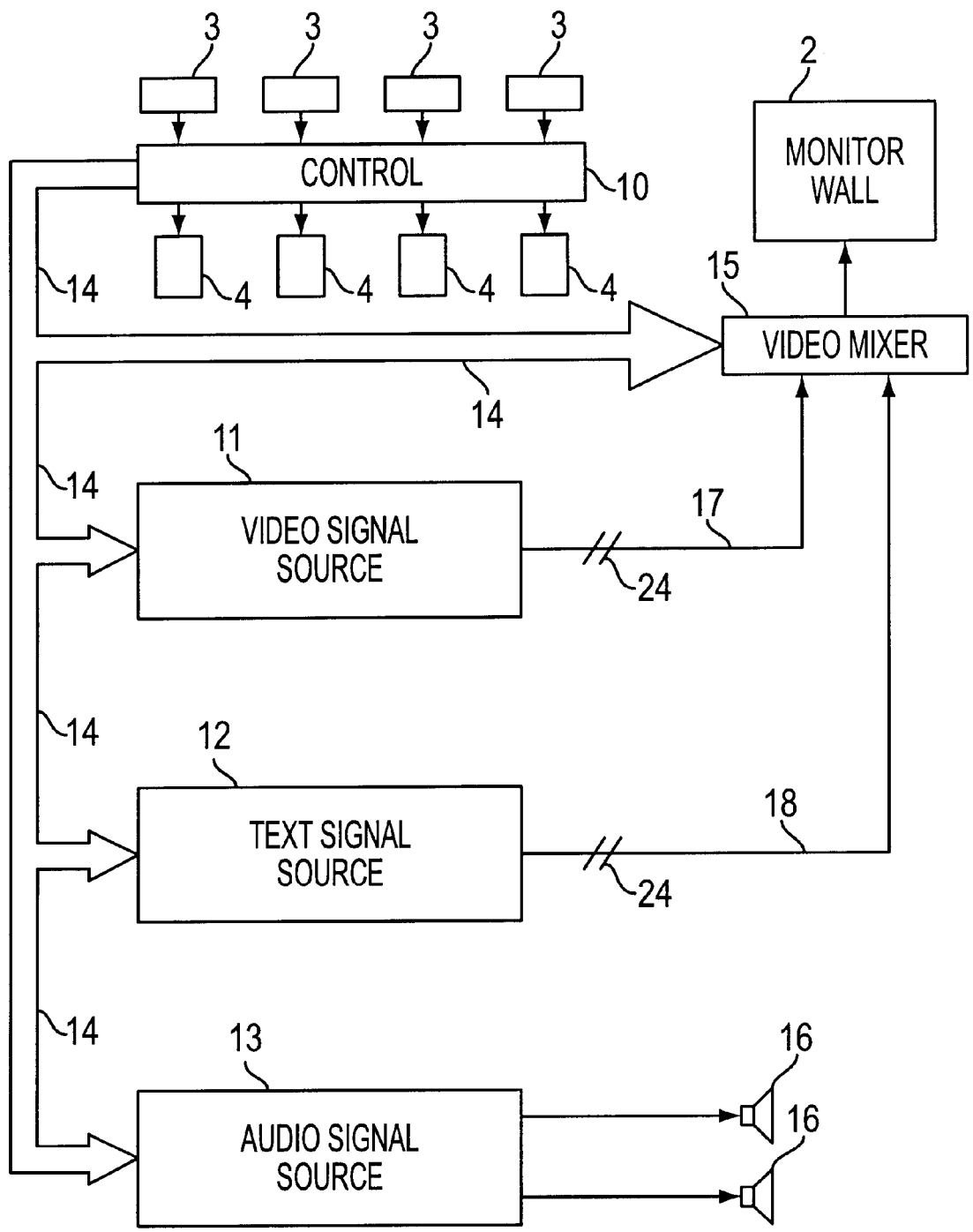
FIG. 3 Shows an electrical block diagram of another exemplary embodiment of a play equipment according to the invention.

As shown in FIG. 3, a control device 10, for example a computer programmed with suitable software takes over the image, text and audio management of monitor wall 2. The still images or moving images to be displayed are supplied by a video signal source 11, which communicates via a data bus 14 with the control device 10. In the process, the control device 10 transmits command signals to the video signal source 11, which retrieve associated individual images or image sequences and switch these to the video signal line 17 at the output of video signal source 11. The successful retrieval of the desired video signals is reported by the video signal source 11, via the data bus 14 and back to the control device 10, so that the control device 10 can always monitor the momentary image status.

In the same way as the video signal source 11, the control device 10 controls a text signal source 12 and, if applicable, an audio signal source 13 via the data bus 14. The audio signals retrieved by the control device 10 (which can be single-channel, double-channel or multi-channel) are reproduced via studio loudspeakers 16. The text signals retrieved by the control device 10 (e.g. comprising letters, digits, graphic symbols, graphics and the like) are switched to the text signal line 18 at the output of the text signal source 12.

The video signal line 17 and the text signal line 18 respectively consist of a grouping of junction lines with 25 individual lines for the 25 monitors 2a, provided as example in FIG. 1. It means that a separate video signal line 17 and a separate text signal line 18 exist for each individual monitor 2a of the monitor wall 2, so that the display of image and text on each individual monitor 2a is controlled separately by the control device 10.

The control device 10 is furthermore electrically connected to the buzzers 3, so that it can be determined which buzzer 3 has been pushed first, following a display of an individual image or a image sequence. The control device 10 assigns a fixed region of the monitor wall 2 (preferably a vertical stripe extending over the total height) to each buzzer 3, which is located below the respective candidate. With the aid of the control device 10, the buzzer 3 which is pushed first following a question will trigger the display of a signaling color on the specified region of monitor wall 2, meaning below the candidate who first pressed the buzzer 3. For example, the screens of all 5 monitors located below the respective candidates can be colored in with the signaling color red, that is to say continuously over a fixed time interval or blinking several times during this fixed time interval. During this aforementioned display of the signaling color, the present image content remains stationary or no image content is shown on the screens for the other monitors 2a.

The control device 10 is furthermore connected to the displays 4, if the displays 4 are provided separate from the monitor wall 2. The control device 10 controls the momentary point count for the individual candidates, which is reproduced on the displays 4. The control device also needs a ± input, operated by the moderator or the show assistant, to "know" whether a candidate who pushed the buzzer 3 first in response to a question has won the points associated with the question, meaning whether these winning points are credited to the candidates account or maybe (in case of a wrong response) are deducted from this account.

The video signal lines 17 and the text signal lines 18 lead from the sources 11 and 12 to a video mixer 15, which in turn is controlled by the control device 10 via the data bus 14. Images and texts are then superimposed in a manner specified by the control device 10 with the aid of video mixer 15. The resulting 25 video signals at the video mixer 15 output are transmitted to the video inputs of the associated 25 monitors 2a and are reproduced there. With the aid of the video mixer 15, the video signals and text signals from the sources 11 and 12 not only can be superimposed, but can also be faded in/faded out, processed or treated in any other desired manner, e.g. by changing the color and brightness. Of course, all of these video-technical measures must first be defined during the programming of the control device 10.

The play equipment according to the invention permits staging an entertainment show with completely new design and dramatic layout of the scene. With respect to space and thus also time, the candidates and their reactions to questions are inseparably connected to the monitor wall 2 and the images, image details, image sequences, graphics and numbers shown on the monitor wall in response to the individual questions. These completely new options in image production make it possible to develop new entertainment shows that appeal to the public.

In addition to the above-described functions, the monitor wall 2 can also be used advantageously in other ways during an entertainment show if, for example, the winning candidate is presented in front of the monitor wall 2, at the end of three question rounds, to answer a winning question. In order to have dramatically effective playing actions during this play situation as well, the candidate can select, for example, one of the 25 monitor fields of the monitor wall 2 on which respectively a question mark or another guessing symbol is shown. To select a monitor field, the candidate can touch the desired monitor field, which is detected by a contact sensor at the screen for each monitor 2a. The monitor wall can also be equipped with a cursor control, so that the candidate can select the desired monitor field by means of a cursor. The sensory contact mechanism of monitors 2a or the cursor control are in turn connected to the control device 10, which is not shown in detail in FIG. 1.

In the latter exemplary case, the control of monitor wall 2 can be designed such that the guessing symbol on the selected monitor field disappears and a winning information is displayed. Since the sensory contact mechanism and the cursor control are connected to the control device 10, the control device 10 can detect the selected monitor field and can execute the previously determined changes in the display.

What is claimed is:

1. A play equipment for staging an entertainment show comprising:
    a monitor wall, composed of several monitors;
    signal sources for graphics signals and text signals;
    a control device for controlling at least one of the graphics and text reproduction on the monitors of the monitor wall;
    mechanically operated switches for a plurality of players; and
    a display for actual account readout of points collected by each one of the plurality of players;
wherein
    specified areas of the monitor wall are assigned to each one of the plurality of players;
    the mechanically operated switches are electrically connected to the control device; and
    the control device is designed such that when a mechanically operated switch is activated by a player reacting first, an optical signal is displayed on the area of the monitor wall that is associated with said player.

2. A play equipment according to claim 1, wherein a supporting structure for the players is installed behind the monitor wall, at such a height that at least the heads of the players project over the monitor wall.

3. A play equipment according to claim 1, wherein a video signal source is provided, which can be controlled by the control device in such a way that still images or moving images can be shown on at least a section of the monitor wall.

4. A play equipment according to claim 1, wherein that the control device furthermore controls a video mixer for the image, graphics and text signals.

5. A play equipment according to claim 1, wherein the control device is designed in such a way that different winning point numbers can be displayed one above the other or side-by-side on the monitor wall.

6. A play equipment according to claim 1, wherein the control device is designed in such a way that currently played winning point numbers can be displayed on the monitor wall.

7. A play equipment according to claim 1, wherein the control device is designed in such a way that the current account balances of the points collected by each player are displayed on the monitor wall, below the respective player.

8. A play equipment according to claim 1, wherein the displays are arranged on the top edge or bottom edge of the monitor wall.

9. A play equipment according to claim 1, wherein the displays are arranged in a hanging console, above the players.

10. A play equipment according to claim 1, wherein the mechanically operated switches are arranged on the top side of the monitor wall.

11. A play equipment according to claim 1, characterized in that the optical signal is displayed over the total vertical height of the monitor wall.

12. A play equipment according to claim 1, wherein the monitors of the monitor wall have contact sensors which are connected to the control device.

13. A play equipment according to claim 1, wherein the monitors of the monitor wall have a cursor control, which is connected to the control device.

* * * * *

UNITED STATES PATENT AND TRADEMARK OFFICE
CERTIFICATE OF CORRECTION

PATENT NO : 6,171,188
DATED : January 9, 2001
INVENTOR(S) : Elstner

It is certified that error appears in the above-identified patent and that said Letters Patent are hereby corrected as shown below:

On the title page, change line [73] to read --Frank Elstner Produktion S.A., Luxembourg--

Signed and Sealed this

Fifteenth Day of May, 2001

Attest:

NICHOLAS P. GODICI

Attesting Officer   Acting Director of the United States Patent and Trademark Office